United States Patent
Amos

(10) Patent No.: US 9,710,784 B2
(45) Date of Patent: Jul. 18, 2017

(54) MARKET DATA-DRIVEN SIMULATION OF ORDER BOOK MECHANICS

(75) Inventor: Matthew Thomas Stephen Amos, Cambridge (GB)

(73) Assignee: Software AG, Darmstadt (DE)

( * ) Notice: Subject to any disclaimer, the term of this patent is extended or adjusted under 35 U.S.C. 154(b) by 2287 days.

(21) Appl. No.: 12/060,109

(22) Filed: Mar. 31, 2008

(65) Prior Publication Data

US 2008/0243572 A1 Oct. 2, 2008

Related U.S. Application Data

(60) Provisional application No. 60/909,178, filed on Mar. 30, 2007.

(51) Int. Cl.
*G06Q 40/00* (2012.01)
*G06Q 10/10* (2012.01)
*G06Q 30/02* (2012.01)

(52) U.S. Cl.
CPC ......... *G06Q 10/10* (2013.01); *G06Q 30/0201* (2013.01)

(58) Field of Classification Search
CPC .............................. G06Q 10/00; G06Q 30/02
USPC .......................... 705/7.11–7.14, 35, 37, 7.29
See application file for complete search history.

(56) References Cited

U.S. PATENT DOCUMENTS

| | | | |
|---|---|---|---|
| 2003/0065608 A1* | 4/2003 | Cutler | ............................. 705/37 |
| 2004/0064395 A1* | 4/2004 | Mintz | .................... G06Q 40/06 |
| | | | 705/37 |
| 2007/0271172 A1* | 11/2007 | Shapiro et al. | ................. 705/37 |
| 2011/0040670 A1* | 2/2011 | Highland et al. | ............... 705/37 |

* cited by examiner

*Primary Examiner* — David Rines
(74) *Attorney, Agent, or Firm* — Nixon & Vanderhye PC

(57) ABSTRACT

A system and a method are disclosed for simulating data driven market order exchange mechanics. An event processing engine receives a feed of market data and forwards it to an exchange simulator. The feed of market data may be recorded market data, live relayed market data, or simulated market data. A series of order requests is also received. The order requests are market order or limit orders, and can include new orders, amend orders, or cancel orders. The feed of market data is analyzed and an inference algorithm is applied by making probabilistic inferences to determine what actions may have occurred to produce the received feed of market data. A second series of order requests are produced. The received order requests and the second series of order requests are combined with normal exchange rules to produce a stream of simulated market data and a series of updated order requests.

27 Claims, 6 Drawing Sheets

MARKET DATA-DRIVEN SIMULATION OF ORDER BOOK MECHANICS

CROSS REFERENCE TO RELATED APPLICATIONS

This application claims the benefit of U.S. Provisional Patent Application No. 60/909,178, filed Mar. 30, 2007, and titled "A Market Data-Driven Simulation of Order Book Mechanics," the contents of which are hereby incorporated by reference.

BACKGROUND

1. Field of Art

This invention relates to the general technology field of event-based computer systems for financial market simulation, and in that field, more specifically to backtesting algorithmic trading systems.

2. Description of the Related Art

When writing an algorithmic trading system, it is necessary to test its efficacy before using it for live trading. There are currently two methods used for this. One is the use of shared test markets, where many different algorithms and systems use a real electronic exchange system, but where no settlement is required. The other common technique is to backtest against recorded historical data. This technique uses the historic data to determine prices at which the orders submitted by an algorithm are filled.

A problem with this technology area is that neither of the existing techniques suffices and an initial test period involving real trading is still required. Test markets are not a good place to test strategies in a competitive environment as they involve no real risk. The market is a complex dynamical system that is highly driven by feedback mechanisms. Ignoring such feedback is therefore unrealistic. Basing the strategy simply on historical data does not account for the feedback due to that strategy in question. Therefore, evaluating its performance without the realistic feedback effects cannot be a realistic strategic validation of the strategy. For example, if a strategy kept buying a stock in a real market this would push the price of doing so up, when filling orders based on historic data only, no change in price would be noticed.

In particular such feedback takes place in a number of orders of complexity. Zero order effects are the direct effects of exchange rules applied in response to order actions e.g. producing trade reports or changing published market depth. First order feedback is an embodiment of the fair market hypothesis under the assumption that the input market data stream represents fair market value, i.e. that over short time periods the algorithm tested can have a significant impact on the market, but that over longer periods this impact tends to zero, where impact is a measure of difference between input and output data. Higher order feedback represents any other more sophisticated feedback, e.g. the presence of arbitrage strategies, or other traders trying to game the strategy under test.

SUMMARY

In an embodiment, an exchange simulator of an event processing engine receives a feed of market data. The feed of market data may be recorded market data, live relayed market data, or simulated market data. A series of order requests is also received. The order requests are market orders or limit orders, and can include new orders, amend orders, or cancel orders. The feed of market data is analyzed by an inference algorithm that makes probabilistic inferences to determine what actions may have occurred to produce the received feed of market data. A second series of order requests are produced. The received order requests and the second series of order requests are combined with normal exchange rules to produce a stream of simulated market data and a series of updated order requests.

The present invention includes a system for data driven simulation of order book mechanics, the system having an input module, an event processing engine and an output module. As noted above, the event processing engine includes an exchange simulator for receiving a feed of market data and order requests and for making probabilistic inferences to determine possible actions taken to produce the received feed of market data and for producing simulated market data and updated order requests. The output module is adapted to communicate with the event processing engine and outputs the simulated market data and the updated order requests. The present invention also includes a method for data driven simulation of order book mechanics comprising: receiving a feed of market data and order requests, making probabilistic inferences to determine possible actions taken to produce the received feed of market data, producing simulated market data and updates order requests, and outputting the simulated market data and updated order requests.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is provided below.

Figure 1:
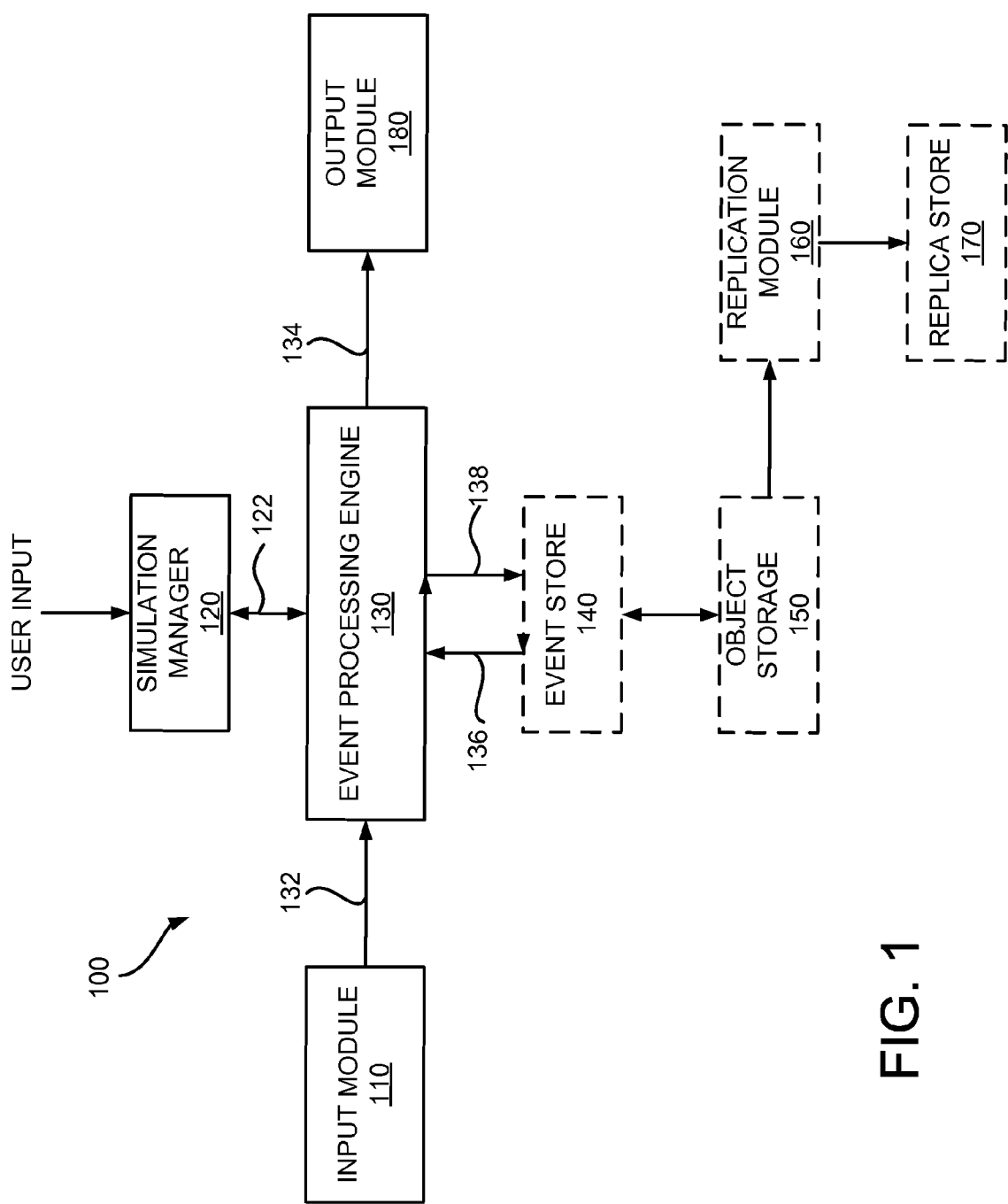
FIG. 1 is a block diagram illustrating an event processing system according to one embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed. For purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment," "an embodiment" or "some embodiments" means that a particular feature, structure or characteristic described in connection with the embodiment is included in at least one embodiment of the invention. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present) and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Architecture

FIG. 1 is a block diagram of an event processing system 100 according to one embodiment of the invention. The event processing system 100 comprises an input module 110, an output module 180, a simulation manager 120 and an event processing engine 130. In some embodiments, the event processing system 100 optionally includes an event store 140, an object storage 150, a replication module 160 and a replica store 170. In one embodiment, one or more of the input module 110, simulation manager 120, event processing engine 130, event store 140, object storage 150, replication module 160, replica store 170 and/or output module 180 communicate between each other using a network (not shown).

The input module 110 is a device or module configured to provide input events to the event processing engine 130. An output of the input module 110 is coupled by signal line 132 to an input of the event processing engine 130. In one embodiment, the input module 110 comprises an alphanumeric device, such as a QWERTY keyboard, a key pad, or representations of such created on a touch screen, adapted to communicate information and/or commands to the event processing engine 130. In another embodiment, the input module 110 is a user input device equipped to communicate positional data as well as command selections to the event processing engine 130 such as a cursor controller, a joystick, a mouse, a trackball, a stylus, a pen, a touch screen, cursor direction keys or other mechanisms to cause movement adjustment of an image. In yet another embodiment, the input module 110 comprises a device including computing capabilities and data communication capabilities that is adapted to communicate with the event processing engine 130.

The simulation manager 120 is a device or module configured for controlling the capture of data during event processing and controlling the simulation of event processing from stored data. The simulation manager 120 is coupled by signal line 122 to provide such control of the event processing engine 130 by sending simulation commands. The simulation manager 120 identifies stored data for simulating event processing of prior input events and/or configuring simulation parameters, such as simulation speed, time range of the simulation, modifications to the stored data prior to simulation or other suitable parameters for modifying the simulation. In the configuration of FIG. 1, the simulation manager 120 and the event processing engine 130 are separate devices. Using separate devices for the simulation manager 120 and the event processing engine 130 allows data capture and/or simulation configuration to be controlled from a location remote from the event processing engine 130. In contrast to the configuration shown in FIG. 1, in one embodiment, a single module implements the functionality of both the simulation manager 120 and the event processing engine 130. In one embodiment, the simulation manager 120 includes an input device, similar to those described above in conjunction with the input module 110, for receiving input from the user and communicating such input which can include information and/or commands to the event processing engine 130. In another embodiment, the simulation manager 120 comprises a device 200 described below in conjunction with FIG. 2, which includes computing capabilities and data communication capabilities for controlling what data is captured or for controlling event processing simulation performed by the event processing engine 130.

The event processing engine 130 receives input events on signal line 132 from the input module 110 and applies an event-based process to the input events. The event-based process evaluates received input events using one or more event processing rules and generates an output action responsive to the evaluation. The output action is provided on signal line 134 by the event processing engine 130 to the output module 180. In one embodiment, the event processing engine 130 also captures data describing how the event-based process is applied to an input event without delaying or otherwise affecting application of the event-based process to the input event. For example, the event processing engine 130 captures data describing the date and time event processing began, data describing the type of input event, data describing intermediate steps in the processing of an input event or other data relevant to event processing. In one embodiment, the event processing data is captured concurrently with processing of the input event, allowing data to be captured in real-time as an input event is being processed.

Some embodiments of the event processing engine 130 also include a store monitor 320 (shown and described below in conjunction with FIG. 3). The store monitor 320 of the event processing engine 130 captures data describing processing of an input event by the event processing engine 130 and captures data describing the input event.

In another embodiment, the event processing engine 130 modifies the event-based process responsive to input from the input module 110 or simulation manager 120. The event processing engine 130 is able to simulate processing by re-processing input events that have been stored in the event store 140. The event processing engine 130 is coupled for communication with the event store 140 by signal lines 136 and 138.

The event processing engine 130 can be implemented in many ways. For example, it is a software process executable by a processor (not shown) and/or a firmware application. The process and/or firmware can be configured to operate on a general purpose microprocessor or controller, a field programmable gate array (FPGA), an application specific integrated circuit (ASIC) or a combination thereof. In another embodiment, the event processing engine 130 comprises a processor configured to process data describing input events and may comprise various computing architectures including a complex instruction set computer (CISC) architecture, a reduced instruction set computer (RISC) architecture or an architecture implementing a combination of instruction sets. The event processing engine 130 can comprise a single processor or multiple processors. In yet another embodiment, the event processing engine 130 comprises multiple software or firmware processes running on a general purpose computer hardware device. For purposes of illustration, FIG. 1 shows the event processing system 100 as having a single event processing engine 130; however, in various embodiments, the event processing system 100 includes a plurality of event processing engines 130.

One embodiment optionally includes an event store 140 that collects data captured by the event processing engine 130. The event store 140 is coupled for communication with the event processing engine 130 by signal lines 136 and 138. Data captured during event processing is communicated to the event store 140 which may also classify the data to facilitate subsequent retrieval. In one embodiment, the event store 140 uses a collector file to initially store captured data. In one embodiment, the event store 140 compares the captured data to one or more grouping criteria and classifies the captured data accordingly. For example, the event store 140 compares captured data to one or more event types and organizes the captured data so that captured data having the same event type is stored together. Additionally, the event store 140 examines a timestamp associated with the captured data and uses the timestamp data to store the captured data in an ordered sequence, such as a chronological sequence of events. In an embodiment, the event store 140 also communicates stored data to the event processing engine 130 to allow processing of previously stored input events, i.e., simulation.

The event store 140 comprises a non-volatile storage device, a volatile storage device or a combination of a non-volatile storage device and a volatile storage device. In one embodiment, the non-volatile storage device is a hard disk drive, a flash memory device or other persistent storage device; and the volatile storage device is a dynamic random access memory (DRAM), a static random access memory (SRAM) or another suitable memory device). Additionally, the event store 140 comprises a software process executable by a processor (not shown) and/or a firmware application configured to classify received data. The process and/or firmware can be configured to operate on a general purpose microprocessor or controller, a field programmable gate array (FPGA), an application specific integrated circuit (ASIC) or a combination thereof.

In one embodiment, the event store 140 uses a plurality of slots to store the captured data. In a slot, the captured data is organized based on a grouping criteria such as an event type or a timestamp associated with the captured data. For example, the captured data is examined for data or metadata specifying an event type, and classified by event type. For example, a field within the captured data includes an event type identifier or metadata associated with the captured data includes an event type identifier. The classified data is then sorted according to a timestamp associated with the captured data. In various embodiments, the timestamp specifies when the captured data was generated by event processing or specifies when the data was captured. Sorting the captured data by timestamp allows data to be stored in slots based on when the data was captured or generated. For example, a slot includes data captured during a specific time interval, such as an hour interval or a multiple hour interval. Storing data according to event timestamps allows the event store 140 to simplify later use of the stored data as input to an event processing simulation.

One embodiment optionally includes an object storage 150 that is coupled for communication with the event store 140. The object storage 150 receives the captured and classified data from the event store 140 and archives the data for later retrieval. This provides access to captured data for later event processing analysis without using resources of the event store 140. This allows the event store 140 to capture and categorize new or additional data from the event processing engine 130. In one embodiment, the object storage 150 comprises a non-volatile storage device, a volatile storage device or a combination of volatile and non-volatile storage devices as described above in conjunction with the event store 140.

The output module 180 receives output actions from the event processing engine 130 on signal line 134 and displays electronic images and/or data corresponding to the received output actions. For example, the output module 180 comprises a light emitting diode (LED) display, liquid crystal display (LCD), cathode ray tube (CRT) display, or any other similarly equipped display device, screen or monitor. In one embodiment, output module 180 is equipped with a touch screen in which a touch-sensitive, transparent panel covers the screen of output module 180. In one embodiment, the output module 180 comprises a discrete device with computing capabilities and data communication capabilities. The output module 180 is adapted to communicate with the event processing engine 130 and generate or display output responsive to data from the event processing engine 130. For example, the output module 180 receives an output action from the event processing engine 130, such as invoking a service, notifying a user, initiating a process or other similar action, and performs or executes the received output action.

In an embodiment, the event processing system 100 optionally comprises a replication module 160 and/or a replica store 170. The replication module 160 is coupled to the object storage 150 and the replica store 170. The replication module 160 generates a replica of the input event and event processing data included in the object storage 150. In an embodiment, one or more generated replicas are transmitted to a remote location, such as the replica store 170, for analysis or to establish a backup repository of the stored input event and event processing data. The replication module 160 comprises a software process executable by a processor (not shown) and/or a firmware application. The process and/or firmware can be configured to operate on one or more processors similar to those described above in conjunction with the event processing engine 130.

The replica store 170 receives a replica of the stored input event and/or event processing data generated by the replication module 160 and stores the replica. In one embodiment, the replica store 170 is remote from the replication module 160, so that a backup copy of the captured data is stored at a remote location or is accessible from a remote location, allowing remote analysis of event processing. In one embodiment, the replica store 170 comprises a non-volatile storage device, a volatile storage device or a combination of volatile and non-volatile storage devices as described above in conjunction with the event store 140.

In an embodiment, a network (not shown) is used to transmit data or instructions between the input module 110, simulation manager 120, event processing engine 130, event store 140, object storage 150, replication module 160, replica store 170 and/or output module 180. In one embodiment, the network comprises a local area network (LAN), a wide area network (WAN) or any other conventional wired data communication system, such as Ethernet, digital subscriber line (DSL), integrated services digital network (ISDN), or any other suitable wired communication system. The network may comprise a conventional wireless data communication system, for example, general packet radio service (GPRS), IEEE 802.11 (or WiFi), IEEE 802.16 (or WiMax), Bluetooth or any other suitable wireless communication system. In another embodiment, the network comprises a combination of a wired communication system and a wireless communication system. In another embodiment, the network is a peer-to-peer configuration where the input module 110, simulation manager 120, event processing engine 130, event store 140, object storage 150, replication module 160, replica store 170 and/or output module 180 directly communicate with each other.

For purposes of illustration, FIG. 1 shows the input module 110, simulation manager 120, event processing engine 130, event store 140, object storage 150, replication module 160, replica store 170 and/or output module 180 as discrete modules. However, in various embodiments, any or all of the above-described modules can be combined. This allows a single module to perform the functions of one or more of the above-described modules.

Figure 2:
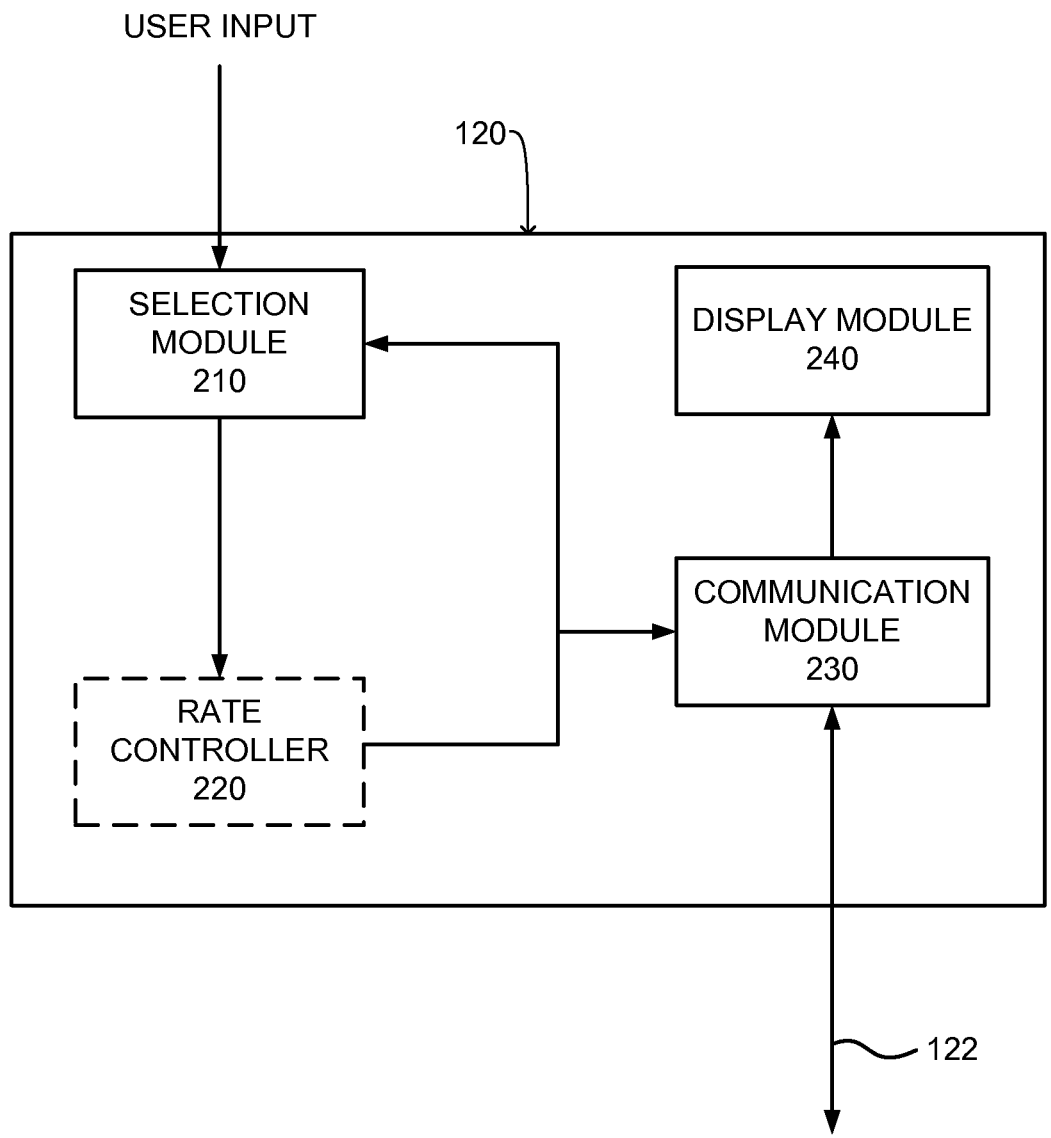
FIG. 2 is a block diagram illustrating a simulation manager for controlling event processing data capture and for specifying data for event processing simulation according to one embodiment of the invention.

FIG. 2 shows an embodiment of the simulation manager 120 for controlling data capture and/or event processing simulation in more detail. The simulation manager 120 comprises a selection module 210, an optional rate controller 220, a communication module 230 and a display module 240. Those of skill in the art will recognize that other embodiments can provide the functionality of FIG. 2 in different ways. Moreover, other embodiments can include different and/or additional features and/or components than the ones described here.

The selection module 210 includes a device or module configured to input data or commands to the simulation manager 120 such as a cursor controller, a keyboard or representations of such, examples of which have been described above. The selection module 210 also includes routines or modules to specify types of data for capture during event processing, data used in a simulation or simulation parameters. The selection module 210 is coupled to the rate controller 220 and the communication module 230 to communicate information and/or commands to the other components of the simulation manager 120.

The optional rate controller 220 receives an input from the selection module 210 and generates control signals to modify a data simulation rate which specifies how rapidly captured data is replayed during simulation. For example, if input from the selection module 210 increases the data simulation rate to process simulation data faster than the original data processing rate, the rate controller 220 generates and transmits a clock scale describing the data simulation rate to the event processing engine 130 via the communication module 230. The clock scale describing the data simulation rate is provided as a control signal to the event processor 310 and the exchange simulator 330 to produce adjustments in the processing rate and the rate at which data is retrieved, respectively. In one embodiment, the rate controller 220 also maintains the temporal order of captured data using timestamps associated with the captured data allowing the captured data to be processed in its originally received order when retrieved from the event store 140. Thus, the rate controller 220 determines how quickly an event-based process is simulated, allowing the event processing engine 130 to simulate event processing using captured data faster than real-time without altering the original processing order of the input events. In an embodiment, the rate controller 220 comprises one or more processors that execute a process and/or a firmware application to implement control of the simulation rate. In another embodiment, the input module 110 communicates with the rate controller 220 to provide information which the rate controller 220 in turn sends to the event processing engine 130 for control of the simulation.

The communication module 230 is coupled to signal line 122 and links the simulation manager 120 to a network or any other interconnected data path across which multiple devices (not shown) may communicate, examples of which have been described above. The communication module 230 is also coupled to the selection module 210, the rate controller 220 and the display module 240. The communication module 230 couples the selection module 210, the rate controller 220 and the display module 240 to the event processing engine 130 for control of the event processor 310, the store monitor 320 and the exchange simulator 330. The communication module 230 transmits control signals from the simulation manager 120 to the event processing engine 130 that, in some embodiments, specify the data to be captured or previously captured data to be used in simulation. The communication module 230 also receives from the event processing engine 130 data describing the processing of an input event, data describing the results of a simulation or results of data capture. In one embodiment, the communication module 230 provides a conventional wired connection, a conventional wireless connection or a combination of the two.

The display module 240 receives simulation or captured event processing data from the communication module 230 and displays electronic images and/or data corresponding to the received data. For example, the display module 240 comprises a display device, such as a light emitting diode (LED) display, a liquid crystal display (LCD), a cathode ray tube (CRT) display, or any other similarly equipped display device, screen or monitor. In another embodiment, the display module 240 comprises a discrete device including computing capabilities and data communication capabilities that is adapted to generate or display output responsive to data from the communication module 230. For example, the display module 240 displays data from the event store 140 or the event processing engine 130, such as results of an event processing simulation or data describing how an event was processed. In some embodiments, the output module 180 can perform some or all of the functionality of the display module 240. For example, the output module 180 can receive the simulation or captured event processing data from the event processing engine 130 through signal line 134 and displays electronic images and/or data corresponding to the received data.

For purposes of illustration, FIG. 2 shows the selection module 210, the rate controller 220, the communication module 230 and the display module 240 as discrete modules. However, in various embodiments, any or all of the selection module 210, the rate controller 220, the communication module 230 and the display module 240 can be combined. This allows a single module to perform the functions of one or more of the above-described modules.

Figure 3:
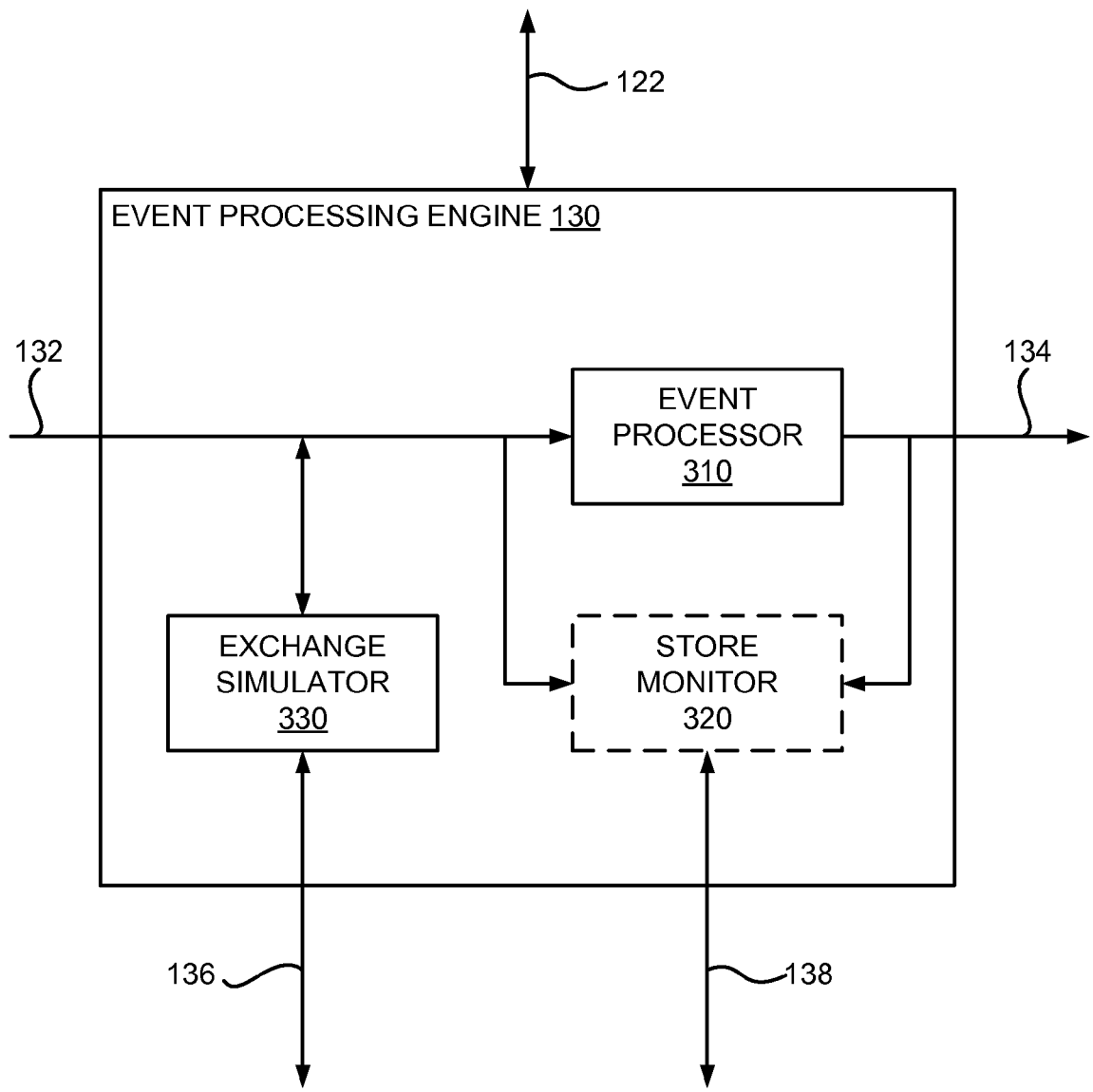
FIG. 3 is a block diagram illustrating an event processing engine for processing an input event according to one embodiment of the invention.

FIG. 3 is a block diagram of an event processing engine 130 for processing an input event and for capturing data describing event processing according to one embodiment of the invention. The event processing engine 130 comprises an event processor 310, a store monitor 320 and an exchange simulator 330. Those of skill in the art will recognize that different embodiments can provide the functionality of FIG. 3 in different ways. Moreover, other embodiments can include different and/or additional features and/or components than the ones described here.

The event processor 310 applies an event-based process to received input events to determine a corresponding output action and may comprise various computing architectures including a complex instruction set computer (CISC) architecture, a reduced instruction set (RISC) architecture or an architecture implementing a combination of instruction sets. Although only a single event processor 310 is shown in FIG. 3, in some embodiments multiple event processors 310 are included. In one embodiment, the event processor 310 is an information appliance equipped to apply one or more event processing rules to a received input event and generate an output action based on application of the one or more event processing rules to the received input event. The event processor 310 has an input coupled to signal line 132 to receive input events and an output coupled to signal line 134 to provide output actions.

The store monitor 320 is adapted to communicate with the event processor 310 and captures data describing processing of the input event by the event processor 310. In particular, the store monitor 320 has an input coupled to signal line 132 to capture input events and a second input coupled to signal line 134 to capture output actions. This configuration allows the store monitor 320 to non-intrusively monitor and capture the event processing without affecting the operation of the event processor 310. In one embodiment, the store monitor 320 generates a copy of data input to or produced by the event processor 310 without altering or delaying application of the event-based process to the received event. For example, the store monitor 320 captures multiple types of data, such as the input event, the event type, a timestamp indicating the time and/or date the input event was received by the event processing engine 130, a timestamp indicating the time and/or date when the captured data or output action was produced by the event processor 310, data modified by the event-based process, data describing the timing of the event processing, types of data generated by the event processing or other data associated with application of the event-based process to the received input event. In one embodiment, the store monitor 320 also compares data from the event processor 310 with stored information indicating data types and/or events to determine a subset of the event processing data to capture. Additionally, the store monitor 320 has an output to provide captured data. The output of the store monitor 320 is coupled to signal line 138 to communicate the captured data to the event store 140 for further processing. Although not shown, the store monitor 320 is coupled to receive control signals from the simulation manager 120 via signal line 122.

The store monitor 320 comprises a storage device, such as described above in conjunction with the event store 140, adapted to communicate with one or more internal processors (not shown). The internal processor executes a software process and/or a firmware application which compares data from the event processor 310 with information describing data types, time intervals or other data identifying data to be captured during event processing. In one embodiment, the internal processor is a general purpose microprocessor which executes the software process and/or firmware application; a field programmable gate array (FPGA); an application specific integrated circuit (ASIC); or a combination of a general purpose microprocessor and an application specific or configurable microprocessor.

The exchange simulator 330 receives stored data and/or simulation parameters and communicates the data and/or simulation parameters to the event processor 310 so the event processor 310 processes the stored data to simulate processing of input events. For example, stored data and/or simulation parameters for the embodiments described below are market data and order requests. In one embodiment, the exchange simulator 330 is coupled to signal line 132 to input data and/or simulation parameters including market data and order requests to the event processor 310, and to signal line 136 to retrieve stored data and/or simulation parameters, such as a feed of market data and order requests, from the event store 140. In second embodiment, the exchange simulator 330 is coupled to 132 to retrieve stored data and/or simulation parameters, such as a feed of market data and order requests, from the input module 110. In third embodiment, as described above, the event processing engine 130 modifies the event-based process responsive to control input from the simulation manager 120 and the exchange simulator 330 of the event processing engine 310 retrieves stored data and/or simulation parameters, such as a feed of market data and order requests, from the simulation manager 120. In fourth embodiment (not shown), the exchange simulator 330 is coupled to the object storage 150 or the replica store 170 to retrieve a feed of market data and order requests from either of them. In yet another embodiment, the exchange simulator 330 also modifies the stored data or the event-based process to simulate event processing using customized data or using a modified event-based process. More detail describing the exchange simulator 330 is described below in the description for FIG. 4.

Additionally in an embodiment, the rate at which the event processor 310 processes input events can be adjusted responsive to a signal from the simulation manager 120 on signal line 122. In concert and responsive to a signal from the simulation manager 120 on line signal 122, the exchange simulator 330 also modifies the rate at which input events are retrieved from the event store 140 and presented to the event processor 310. This effectively allows playback speed of the event simulation to occur faster or slower than real-time event processing. For example, responsive to input from the simulation manager 120, the exchange simulator 330 increases the rate at which data is communicated from the event store 140 to the event processor 310. This modification of data transfer rate to the event processor 310 decreases the time necessary for event processing simulation. The exchange simulator 330 advantageously can retrieve data and modify the retrieved data based on one or more configuration parameters to allow customization of the event-based processing simulation. Although not shown, the exchange simulator 330 is coupled to receive control signals from the simulation manager 120 via signal line 122.

In one embodiment, exchange simulator 330 comprises a process executable by a processor (not shown) and/or a firmware application. The process can be configured to operate on a general purpose microprocessor or controller, a field programmable gate array (FPGA), an application specific integrated circuit (ASIC) or a combination thereof. In an embodiment, the exchange simulator 330 comprises a processor configured to process data describing events which may comprise various computing architectures including a complex instruction set computer (CISC) architecture, a reduced instruction set computer (RISC) architecture or an architecture implementing a combination of instruction sets. The exchange simulator 330 can comprise a single processor or multiple processors. In an embodiment, the exchange simulator 330 comprises multiple software or firmware processes running on a general purpose computer hardware device. More details describing the components of the exchange simulator 330 are provided below in the description for FIG. 4.

For purposes of illustration, FIG. 3 shows the event processor 310, the store monitor 320 and the exchange simulator 330 as discrete modules. However, in various embodiments, any or all of the event processor 310, the store monitor 320 and/or the exchange simulator 330 can be combined. This allows a single module to perform the functions of one or more of the above-described modules.

Figure 4A:
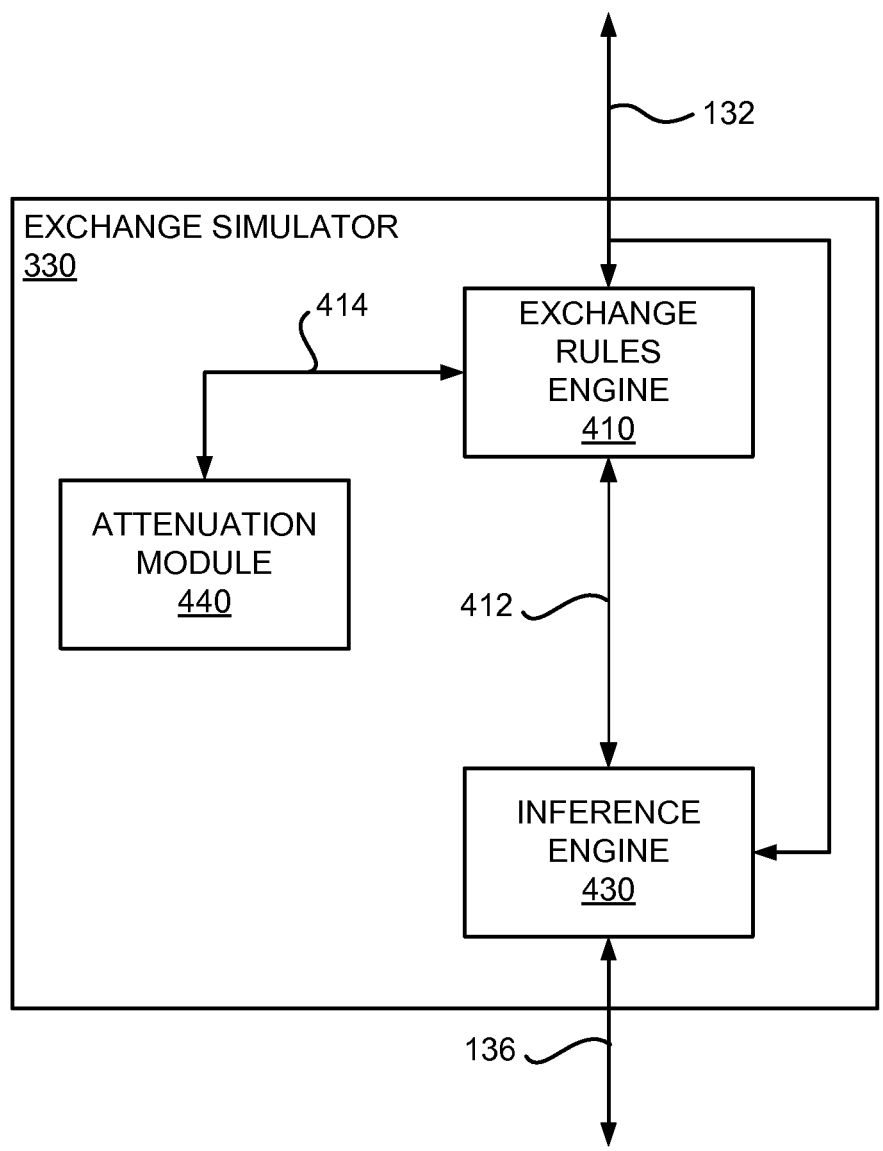
FIG. 4A is a block diagram illustrating an exchange simulator according to one embodiment of the invention.

FIG. 4A is a block diagram illustrating the exchange simulator 330 in more detail according to a first embodiment. The exchange simulator 330 comprises an exchange rules engine 410, an inference engine 430 and an attenuation module 440. Those of skill in the art will recognize that different embodiments can provide the functionality of FIG. 4 in different ways. Moreover, other embodiments can include different and/or additional features and/or components than the ones described here.

In general, the exchange simulator 330 bridges the gap between test markets and the use of historic market data. The exchange simulator 330 simulates the mechanics of an order book, which lists quotes to buy stock (or any other exchanged item) and quotes to sell stock (or any other exchanged item), by taking a feed of market data and makes probabilistic inferences to determine what may have occurred to produce the historical output. The exchange simulator 330 simulates the behavior of an exchange from the point of view of an application being tested. The exchange simulator 330 generates simulated market data and updated order requests and sends the simulated market data and updated order requests to the event processing engine 130 for processing. The behaviors are simulated using a feed of market data, including tick information and depth information. Tick information is the details of a trade and depth information is the details of a current order book. The exchange simulator 330 receives a feed of market data at the inference engine 430. The feed of market data can be recorded market data, live related market data, simulated market data or no market data at all. When used with no input market data and multiple test applications, strategies can be tested with counter strategies to provide a controlled competitive environment.

In some embodiments, the inference engine 430 of the exchange simulator 330 is adapted to communicate with the event store 140 and a feed of market data is received at the inference engine 430 from the event store 140 through signal line 136. In other embodiments, the inference engine 430 is also adapted to communicate with the input module 110 and the feed of market data is received at the inference engine 430 from the input module 110 through signal line 132. The inference engine 430 is also adapted to communicate with the exchange rules engine 410 and receives order events through signal line 412.

The inference engine 430 of the exchange simulator 330 is also adapted to communicate via signal line 412 with the exchange rules engine 410 in order to send and receive order events to and from the exchange rules engine 410. The inference engine 430 is used to determine, in a probabilistic way, what the intent of a trader in an ideal market was from any reductions in depth in the feed of market data. For example, the inference engine 430 observes reductions in the feed of market data from the information in the feed of market data and determines whether a cancel operation or trade caused it. The determination is probabilistic, making the best use of the information available. The inference engine 430 compares each external depth event to the one that preceded it. Each reduction of depth is then determined to be either a trade or a cancel. If the reduction occurred at any price other than the best price, it is determined to be a cancel. If it occurs at the best price, there is a chance that the determination will be a trade according to some embodiments. The inference engine 430 determines what may have happened to produce the received feed of market data, and produces order requests from the received feed of market data.

The exchange rules engine 410 is adapted to communicate with the inference engine 430 and the attenuation engine 440, and receives order requests from the inference engine 430 through signal line 412. Normal exchange rules are applied to the order requests received from the inference engine 430, the attenuation module 440 and the input module 110. Normal exchange rules are public knowledge and are, for example, normal events that occur during an exchange to produce a particular outcome. The application of the exchange rules produces simulated market data, along with updated order requests are produced and relayed to the event processor 310 through signal line 132.

The attenuation module 440 is adapted to communicate via signal line 414 with the exchange rules engine 410 of the exchange simulator 330 and listens for trade events, new limit orders and cancellations. Through signal line 414, attenuation module 440 receives simulated market data from the exchanges rules engine 410 and listens to the operations performed by the exchange rules engine 410 and will reverse their effects some time later. In some embodiments, a timer is set in response to an order being completed, filled or cancelled and an attenuation message is sent to the exchange rules engine 410 through signal line 414. The attenuation module 440 implements a counter strategy that applies the fair market hypothesis under the assumption that the input market data is an approximation to fair market value. The fair market hypothesis, also known as the efficient market hypothesis, is the idea that the market will achieve a fair price over time. Therefore, the attenuation module 440 will reverse the effects of any strategy over some non zero length of time. In other words, after a certain period of time, the attenuation module 440 will simulate the actions of a third party trader doing the opposite of what was done to produce the simulated market data. The exchange rules engine 410 is also adapted to communicate with the event processor 310 through signal line 132 and sends simulated market data and updated order requests to the event processor 310.

For purposes of illustration, FIG. 4A shows the exchange rules engine 410, inference engine 430, and attenuation module 440 as discrete modules. However, in various embodiments, any or all of the exchange rules engine 410, inference engine 430, and attenuation module 440 can be combined. This allows a single module to perform the functions of one or more of the above-described modules.

Figure 4B:
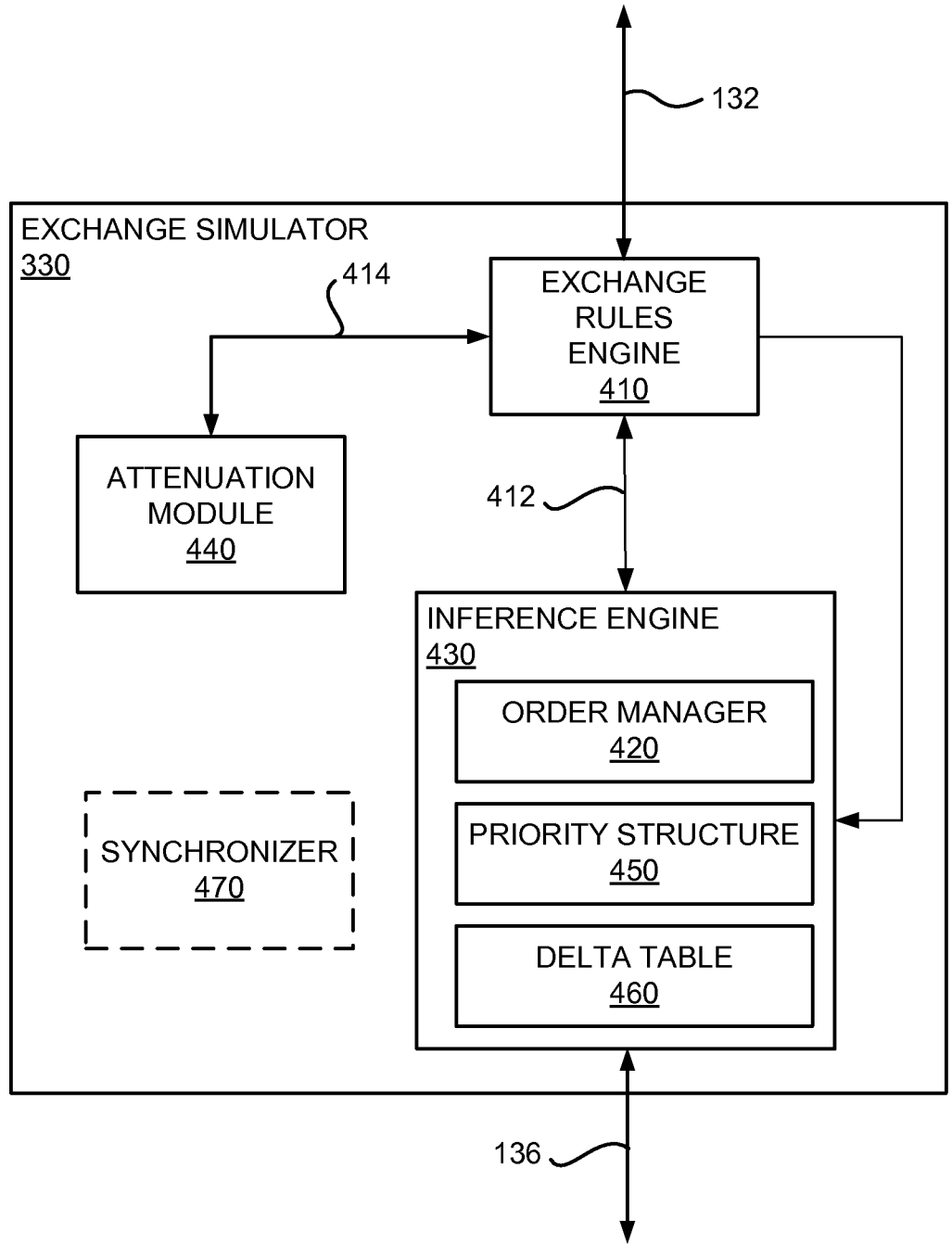
FIG. 4B is a block diagram illustrating an exchange simulator according to another embodiment of the invention.

FIG. 4B is a block diagram illustrating a second embodiment of the exchange simulator 330. In this embodiment, the exchange rules engine 410, inference engine 430 and attenuation module 440 of exchange simulator 330 function in a similar manner to that as described above. However, the inference engine 430 further comprises an order manager 420, priority structure 450 and delta table 460. In some embodiments, exchange simulator 330 also comprises a synchronizer 470.

The priority structure 450 and the delta table 460 simulate a specific set of exchange rules. The priority structure 450 is adapted to communicate with the other modules of the exchange simulator 330 and is used to simulate the prioritization of an order, i.e. limit orders placed by the system are filled when they would have been had they been placed in the original market to the best approximation. For example, an order to buy at best price where $1000 is already available at best price will not be filled until the $1000 is traded or cancelled. The priority structure 450 maintains a priority value for each limit order. It also maintains an ordered list of orders and their priorities for each price. The priorities are adjusted in response to two kinds of events: cancellations of the system's limit orders and operations of other traders performed in the ideal market (a market outside the system). A priority figure is a number representing the depth that must be consumed before the order can be filled at its price. When a new limit order is received, it is added to the priority structure 450 along with a priority equal to the current simulated market depth for the price. When orders are cancelled, the priority values of all the other orders at the same price with a higher priority value are reduced by the size of the order. In some embodiments, events from the inference engine 430 changes the priority values. The inference engine 430 accesses and interacts with the priority structure 450 when processing a new feed of market data and order requests, and also when inferring the causes of changes in the data.

The delta table 460 is adapted to communicate with the other modules of the exchange simulator 330 and is used to maintain a table of differences between the input feed of market data and the output simulated market data. The delta table 460 is updated in response to all market depth events, fills of market order, and submissions, modification, and cancellations of limit orders. When a limit order is filled by the order manager 420, positive depth deltas are pushed down in the order book. The delta table 460 publishes the latest simulated depth when the synchronizer 470 requests it. The delta table 460 will only publish the depth if it is changed, that is either the external depth event is received or some change occurs to the delta table. The simulated depth is calculated by applying the delta table 460 to the latest external market depth. This is done when the publish request is made. The deltas are applied in order, from the best price to the worst price. The resulting quantity at each price is the sum of the external depth and the delta. In some embodiments, when this value is negative, the quantity is set to zero and the remainder is cascaded to the next price. For example, the depth price is the original price plus the delta minus any cascade value from the previous price. When a trade event is received, the delta table 460 signals that a market order was filled. A negative delta will be applied at the price the trade occurred. When limit orders are placed, a positive delta will be applied for the volume at the price. When these orders are filled, the depth is pushed down to a lower price. In some embodiments, the attenuation module 440 also sends events to the delta table 460, reversing the effects of the other changes to the delta table. The inference engine 430 accesses and interacts with the delta table 460 when processing a new feed of market data and order requests, and also when determining changes in the data.

One embodiment of the invention includes an optional synchronizer 470 that is adapted to communicate with the other modules of the exchange simulator 330 and coordinates the activities of the services performed by the exchange rules engine 410, the order manager 420, inference engine 430, attenuation module 440, priority structure 450 and delta table 460. For example, when a tick comes in from the feed of market data feed, the synchronizer 470 will route an internal version of this event for the other modules to consume, request a delta table 460 to produce a new simulated depth event and publish that depth to the algorithm.

For purposes of illustration, FIG. 4B shows the exchange rules engine 410, order manager 420, inference engine 430, attenuation module 440, priority structure 450, delta table 460 and synchronizer module 470 as discrete modules. However, in various embodiments, any or all of the exchange rules engine 410, order manager 420, inference engine 430, attenuation module 440, priority structure 450, delta table 460 and synchronizer module 470 can be combined. This allows a single module to perform the functions of one or more of the above-described modules.

System Operation

Figure 5:
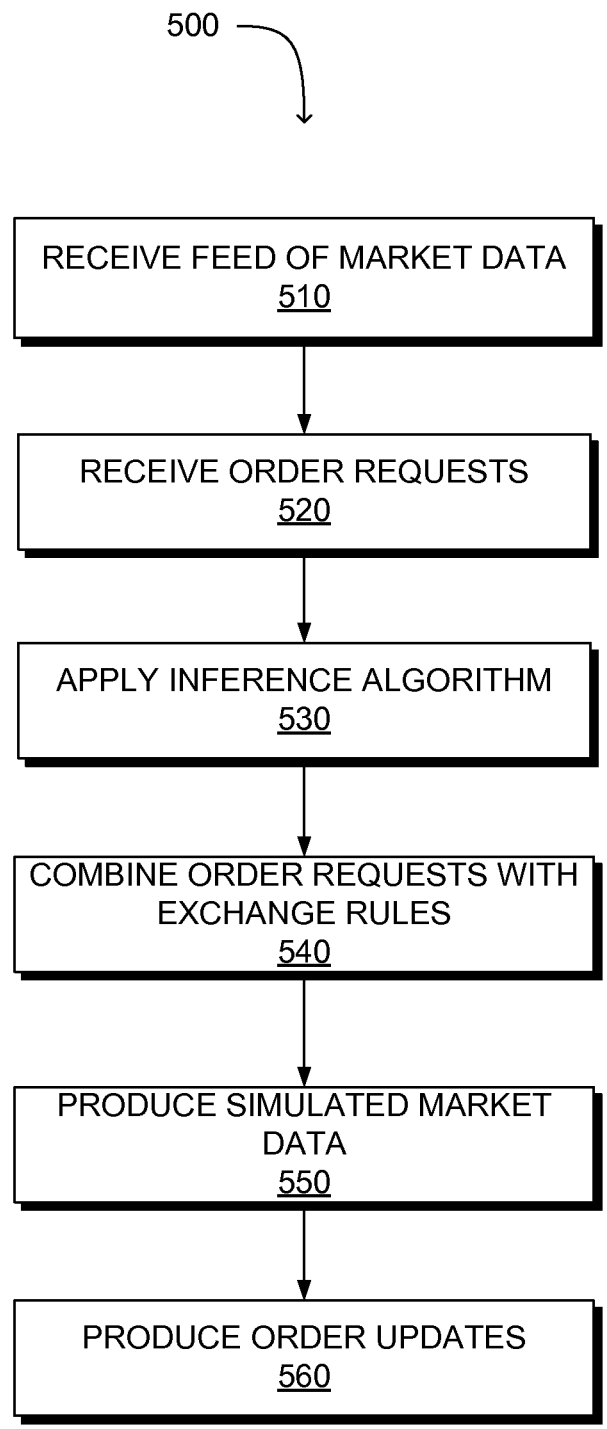
FIG. 5 is a flow chart of the steps performed by the exchange simulator in accordance with one embodiment of the invention.

FIG. 5 is a flow chart of the steps performed by the exchange simulator 330 in accordance with some embodiments. Those of skill in the art will recognize that other embodiments can perform the steps of FIG. 5 asynchronously, in different orders, or include different and/or additional steps than the ones described herein.

A feed of market data is retrieved 510 from the event store 140 and forwarded to the exchange simulator 330. In some embodiments, the feed of market data is received 510 at the input module 110 and forwarded to the inference engine 430 of the exchange simulator 330. In some embodiments, the feed of market data is recorded market data. In other embodiments, the feed of market data is live relayed market data. In yet other embodiments, the feed of market data is simulated market data. A series of order requests are received 520 from the input module 110 at the exchange rules engine 410 of the exchange simulator 330. In some embodiments, order request are market orders or limit orders and are received. In some embodiments, the market order and limit orders are new orders. In other embodiments, the market orders are amend orders. In yet other embodiments, the market orders are cancel orders. The inference engine 430 of the exchange simulator 330 analyzes the feed of market data and applies 530 an inference algorithm by making probabilistic inferences to determine what actions may have occurred to produce the received feed of market data and produces a second series of order requests. The exchange rules engine 410 combines 540 the received order requests with the second series of order requests with normal exchange rules to produce a stream of simulated market data 550 and a series of updated order requests 560, which are sent to the output module 180 for display.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system for data driven simulation of order book mechanics, the system comprising:
    at least one computer processor configured as an event processing engine having an exchange simulator configured to process a received feed of market data and a first series of order requests to produce a second series of order requests by applying probabilistic inferences of past possible actions taken to produce the received feed of market data, wherein the probabilistic inferences are based on i) differences between prices and quantities of a depth event in the received feed of market data at different points in time and ii) stored probability value assumptions;
    the at least one computer processor also configured as an exchange rules engine that is configured to combine the first and second series of order requests to produce simulated market data and updated order requests, wherein the updated order requests are prioritized according to a priority structure;
    an output configured to communicate with the event processing engine, for outputting a result based on the simulated market data and the updated order requests; and
    a rate controller configured to adjust a rate at which the simulated market data and the updated order requests are produced by adjusting a rate at which the event processing engine processes the received feed of market data and the first series of order requests, the rate being set based on a user selection that corresponds to a clock scale used by the event processing engine in processing the received feed of market data and the first series of order requests.

2. The system of claim 1, wherein the exchange simulator comprises an inference engine for making probabilistic inferences to determine past possible actions taken to produce the received feed of market data.

3. The system of claim 2, wherein the exchange simulator comprises an order manager, configured to communicate with the inference engine, for receiving order requests.

4. The system of claim 2, wherein the exchange simulator comprises a priority structure, configured to communicate with the inference engine, for simulating prioritization of order requests.

5. The system of claim 2, wherein the exchange simulator comprises a delta table, configured to communicate with the inference engine, for maintaining a table of differences between the received feed of market data and the simulated market data.

6. The system of claim 1, wherein the exchange simulator comprises an attenuation module, configured to communicate with the exchange rules engine, for executing counter strategies.

7. The system of claim 1, wherein the received feed of market data includes at least one of recorded market data, live relayed marked data, and simulated market data.

8. The system of claim 1, wherein the order requests are at least one of new orders, amend orders, and cancel orders.

9. The system of claim 1, further comprising:
    an input module for receiving the first series of order requests and sending the first series of order requests to the event processing engine.

10. The system of claim 1, wherein the feed of market data and the first series of order requests is received at a first rate, and wherein the rate controller is further operable, based on user input, to control the event processing engine to process the received feed of market data and the first series of order requests faster than the first rate.

11. The system of claim 1, wherein the rate controller is controllable, based on user input, to cause simulation data to be processed at a data simulation rate that is faster than the rate at which the feed of market data and the first series of order requests is received.

12. The system of claim 1, wherein a data simulation rate specifies how rapidly the received feed of market data and the first series of order requests is replayed during simulation, and wherein the rate controller is controllable, based on user input, to increase the data simulation rate to process simulation data faster than a rate at which the feed of market data and the first series of order requests is originally received.

13. An apparatus for data driven simulation of order book mechanics, the apparatus comprising at least one computer processor that is configured as:
   an inference engine, configured to process a received feed of market data and a first series of order requests to produce a second series of order requests by applying probabilistic inferences of past possible actions taken to produce the received feed of market data, wherein the probabilistic inferences are based on i) differences between prices and quantities of a depth event in the received feed of market data at different points in time and ii) stored probability value assumptions;
   an exchange rules engine, configured to communicate with the inference engine, that is configured to combine the first and second series of order requests to produce simulated market data and updated order requests, wherein the updated order requests are prioritized according to a priority structure; and
   a rate controller configured to adjust a rate at which the simulated market data and the updated order requests are produced by adjusting a rate at which the inference engine processes the received feed of market data and the first series of order requests, the rate being set based on a user selection that corresponds to a clock scale used by the inference engine in processing the received feed of market data and the first series of order requests.

14. The apparatus of claim 13, further comprising a display, configured to communicate with the exchange rules engine for displaying the simulated market data and updated order requests.

15. The apparatus of claim 13, wherein the at least one computer processor is further configured as an attenuation module, configured to communicate with the exchange rules engine, for executing counter strategies.

16. The apparatus of claim 13, wherein the inference engine includes an order manager for receiving the first series of orders.

17. The apparatus of claim 13, wherein the inference engine includes a priority structure for simulating prioritization of an order.

18. The apparatus of claim 13, wherein the inference engine includes a delta table for maintaining a table of differences between the received feed of market data and the simulated market data.

19. The apparatus of claim 13, wherein the feed of market data includes at least one of recorded market data, live related market data, and simulated market data.

20. The apparatus of claim 13, wherein the order requests are at least one of new orders, amend orders, and cancel orders.

21. A method for data driven simulation of order book mechanics comprising:
   receiving a feed of market data and a first series of order requests at an exchange simulator;
   using a computer processor configured as the exchange simulator, processing the feed of market data and the first series of order requests to produce a second series of order requests by applying probabilistic inferences of past possible actions taken to produce the received feed of market data, wherein the probabilistic inferences are based on i) differences between prices and quantities of a depth event in the received feed of market data at different points in time and ii) stored probability value assumptions;
   using an exchange rules engine, combining the first and second series of order requests to produce simulated market data and updated order requests, wherein the updated order requests are prioritized according to a priority structure; and
   outputting the simulated market data and updated order requests,
   wherein a rate at which the simulated market data and the updated order requests are produced is adjustable via a rate controller adjusting a rate at which the exchange simulator processes the received feed of market data and the first series of order requests, the rate being set via the rate controller and based on a user selection that corresponds to a clock scale used by the inference engine in processing the received feed of market data and the first series of order requests.

22. The method of claim 21, further comprising:
   executing counter strategies using the exchange simulator.

23. The method of claim 21, further comprising:
   using a synchronizer, coordinating activities performed on the received feed of market data and first series of order requests.

24. The method of claim 21, further comprising: simulating prioritization of an order using a priority structure.

25. The method of claim 21, further comprising:
   maintaining a table of differences between the received feed of market data and the simulated market data.

26. The method of claim 21, wherein the received feed of market data includes at least one of recorded market data, live relayed marked data, and simulated market data.

27. The method of claim 21, wherein the order requests are at least one of new orders, amend orders, and cancel orders.

* * * * *